United States Patent [19]

Ishizuka

[11] Patent Number: 4,890,045
[45] Date of Patent: Dec. 26, 1989

[54] SPINDLE MOTOR CONTROL SYSTEM FOR MAGNETIC DISK APPARATUS

[75] Inventor: Hiromi Ishizuka, Tokyo, Japan
[73] Assignee: NEC Corporation, Tokyo, Japan
[21] Appl. No.: 292,602
[22] Filed: Dec. 28, 1988

[30] Foreign Application Priority Data

Dec. 28, 1987 [JP] Japan ............................ 62-335963

[51] Int. Cl.$^4$ .............................................. G05B 1/02
[52] U.S. Cl. ..................................... 318/608; 318/85; 360/73.03; 360/73.02; 375/119
[58] Field of Search ............... 318/608, 85; 360/73.03, 360/73.02; 375/119

[56] References Cited

U.S. PATENT DOCUMENTS

| | | | |
|---|---|---|---|
| 3,893,178 | 7/1975 | Sordello | 318/85 X |
| 4,357,707 | 11/1982 | Delury | 375/119 |
| 4,471,390 | 9/1984 | Hamann | 360/73.02 X |
| 4,618,897 | 10/1986 | Johnson et al. | 360/73.03 X |

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A disk apparatus spindle motor control system has a control circuit including a frequency generator for generating a master clock signal of a predetermined frequency, a first frequency divider for frequency-dividing the master clock signal by $2^1, 2^2, \ldots, 2^N$, a second frequency divider for frequency-dividing the signal frequency-divided by $2^N$ to generate a master index signal upon each rotation of the spindle motor, a time interval detector for detecting a time interval between the master index signal and an index signal output from a magnetic disk unit and outputting a phase control signal and a select signal corresponding to the detected time interval, a data selector for selecting and outputting one of the signals frequency-divided by $2^1, 2^2, \ldots, 2^N$ in accordance with the select signal, a clock window circuit for masking the master clock signal for a time period in accordance with the phase control signal, and a third frequency divider for frequency-dividing the output from the clock window circuit and supplying the frequency-divided signal as the clock signal to the magnetic disk unit.

4 Claims, 4 Drawing Sheets

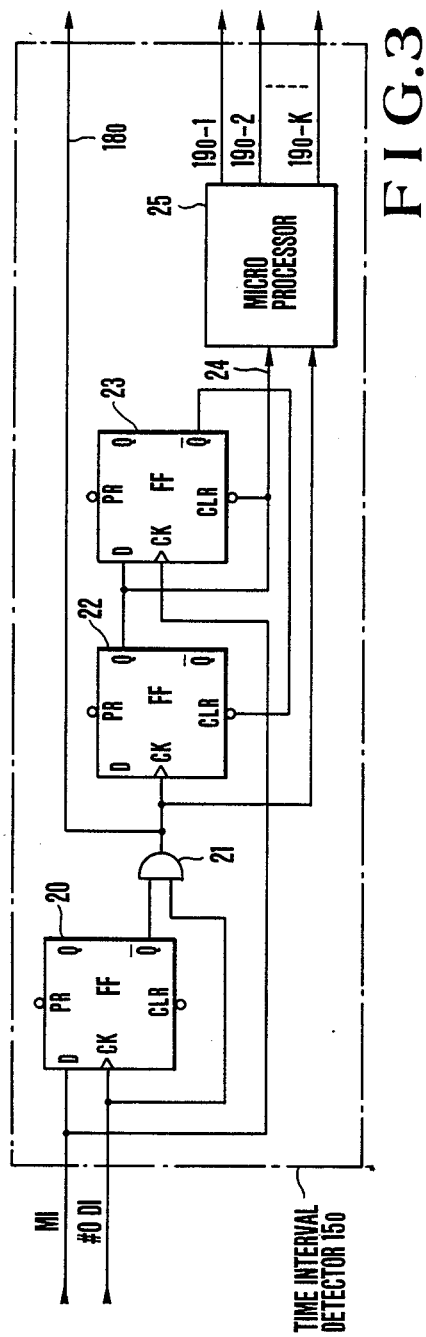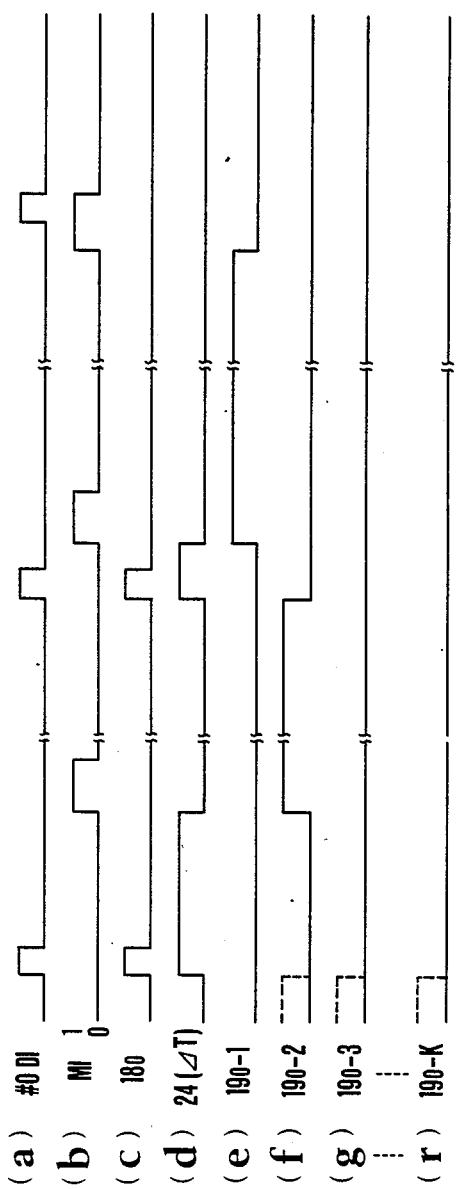

SPINDLE MOTOR CONTROL SYSTEM FOR MAGNETIC DISK APPARATUS

BACKGROUND OF THE INVENTION

The present invention relates to a spindle motor control system for a magnetic disk apparatus and, more particularly, to a spindle motor control system for controlling a plurality of disk apparatuses to be driven in synchronism with each other.

In a conventional spindle motor control system for a magnetic disk apparatus, speed control is performed for each spindle motor within the range of upper and lower limits of the rotation speed of the spindle motor, and then synchronization between the respective spindle motors is controlled. The rotation speeds of the plurality of spindle motors differ from each other and variations in rotation speed also differ from each other because loads acting on the motors are different. Therefore, it is difficult to maintain the rotation speeds and the phases of the plurality of spindle motors coincident with each other for a long period of time.

The present inventor has invented a multi-spindle synchronization control system which eliminates the above drawback of the conventional technique and can easily and accurately synchronize a plurality of magnetic disk units and filed a patent application for the system on June 17, 1988 (U.S. patent application Ser. No. 207,984).

SUMMARY OF THE INVENTION

It is a principal object of the present invention to improve the multi-spindle synchronization control system according to the above invention and to provide a higher-performance spindle motor control system.

In order to achieve the above object of the present invention, there is provided a spindle motor control system for a magnetic disk apparatus comprising at least one magnetic disk unit which outputs an index signal upon rotation of a spindle therein and inputs a control signal for controlling rotation of the spindle motor by the clock signal, and control means for inputting the index signal from the at least one magnetic disk unit to output the control signal, the control means comprising a frequency generator for generating a master clock signal of a predetermined frequency, a first frequency divider for frequency-dividing the master clock signal from the frequency generator to generate a plurality of frequency-divided signals, a second frequency divider for frequency-dividing one of the plurality of frequency-divided signals to generate a master index signal upon each rotation of the spindle motor, a time interval detector for detecting a time interval between the master index signal and the index signal output from the at least one magnetic disk unit and outputting a phase control signal and a select signal corresponding to the detected time interval, a data selector for selecting and outputting one of the plurality of frequency-divided signals in accordance with the select signal, a clock window circuit for masking the master clock signal from the frequency generator in accordance with the phase control signal, the master index signal, and an output signal of said data selector, and a third frequency divider for frequency-dividing the output from the clock window circuit to output the clock signal to the magnetic disk unit.

BRIEF DESCRIPTION OF THE DRAWINGS

FIG. 3 is a block diagram showing an embodiment of a time interval detector shown in FIG. 2;

FIGS. 4(a) to 4(h) are timing charts for explaining an operation of the circuit shown in FIG. 3;

DETAILED DESCRIPTION OF THE PREFERRED EMBODIMENTS

Embodiments of the present invention will be described in detail below with reference to the accompanying drawings.

Figure 1:
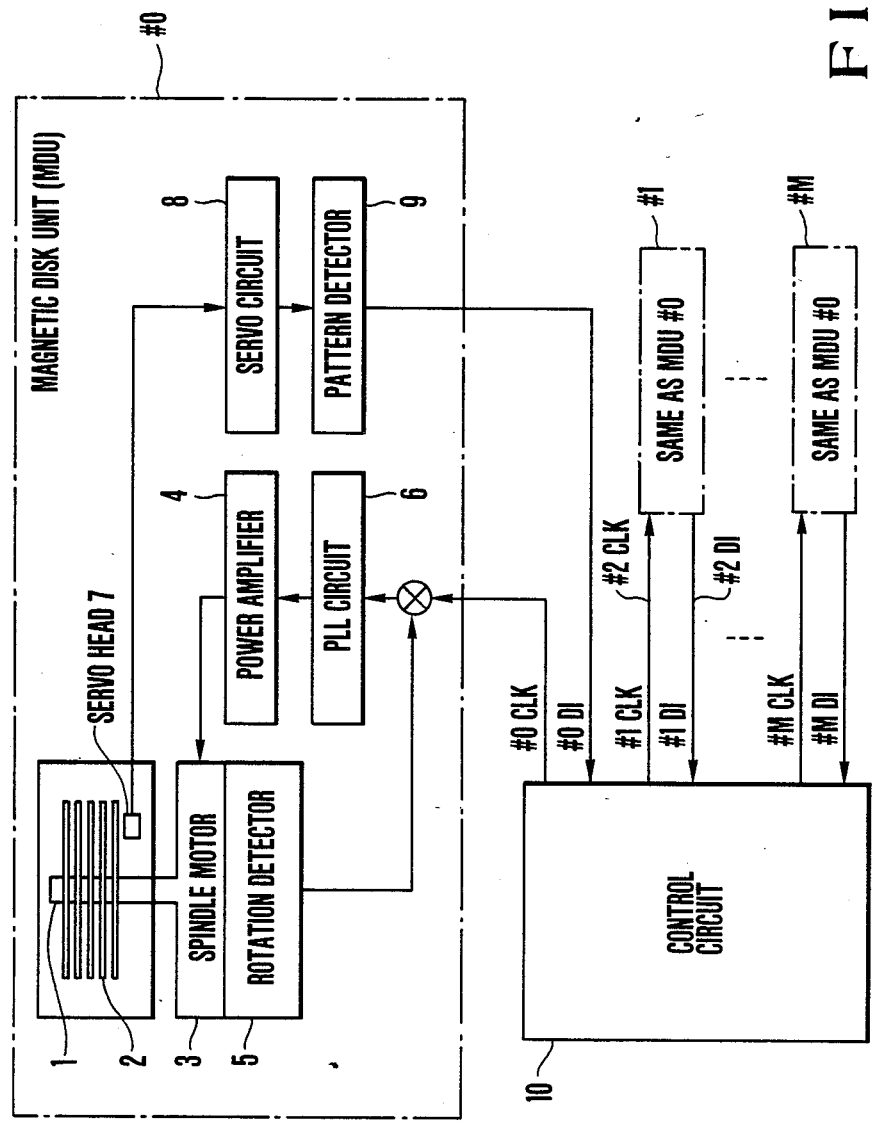
FIG. 1 is a block diagram showing an overall arrangement of an embodiment of the present invention.

FIG. 1 is a block diagram showing an arrangement of an embodiment of the present invention.

In FIG. 1, a plurality of magnetic disk units #0 to #M having the same arrangement are connected to a control circuit 10.

In a magnetic disk unit #0, a plurality of magnetic disks 2 mounted on a spindle 1 are rotated by a spindle motor 3. Rotation of the spindle motor 3 is controlled by an output signal from a power amplifier 4 for driving the spindle motor, and a rotation state of the spindle motor 3 is detected by a rotation detector 5. The rotation detector 5 outputs a plurality of pulse trains synchronized with rotation of the spindle motor 3. The power amplifier 4 is controlled by a PLL (Phase Locked Loop) circuit 6 for controlling the rotation speed of the spindle motor 3. A servo head 7 reads a servo pattern (not shown) written on the servo surface of the magnetic disk 2 and supplies the read signal to a pattern detector 9 through a servo circuit 8. The pattern detector 9 outputs a disk index pulse #0DI to the control circuit 10 on the basis of the above input signal. Similarly, each of index pulses #1DI to #MDI output from the other magnetic disk units #1 to #M, respectively, is output to the control circuit 10.

Figure 2:
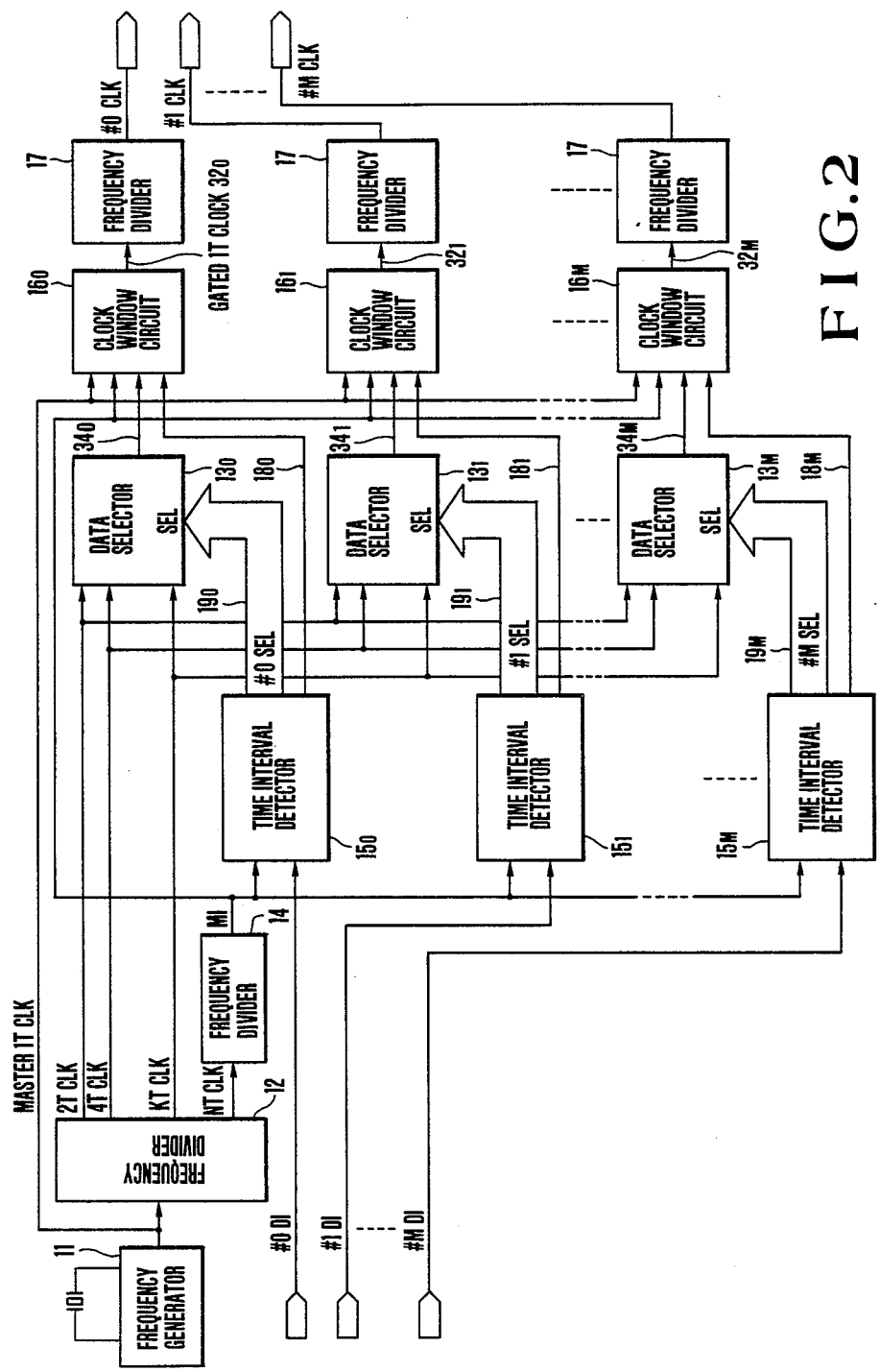
FIG. 2 is a block diagram showing an embodiment of a control circuit shown in FIG. 1.

FIG. 2 shows an embodiment of the control circuit 10 shown in FIG. 1. Referring to FIG. 2, the control circuit 10 comprises: a frequency generator 11 consisting of a quartz oscillator for generating a signal MASTER 1T CLK of a predetermined frequency; a frequency divider 12 for frequency-dividing the signal MASTER 1T CLK output from the frequency generator 11 into fractions of $2^1$, $2^2$, ..., $2^N$ and outputting frequency-divided signals 2T CLK, 4T CLK, ..., NT CLK; a frequency divider 14 for frequency-dividing the $\frac{1}{2}^N$-frequency-divided signal NT CLK into a signal corresponding to one rotation of the spindle motor 3 and outputting this signal as master index signal MI; a time interval detector $15_i$ ($i=0$ to M) for detecting a time interval between the master index signal MI and an index signal #iDI output from the disk unit #i and outputting a phase control signal $18_i$ and a predetermined select signal $19_i$ corresponding to the time interval; a data selector $13_i$ ($i=0$ to M) for selecting one of the output signals 2T CLK, 4T CLK, ..., KT CLK ($K<N$) from the frequency divider 12 in accordance with the select signal $19_i$ and outputting a selected signal $34_i$; a clock window circuit $16_i$ ($i=0$ to M) for receiving the master index signal MI, the signal MASTER 1T CLK from the frequency generator 11, the output signal $34_i$ from the data selector $13_i$ and the phase control signal $18_i$ and outputting a signal GATED 1T CLK $32_i$ obtained by masking the signal MASTER 1T CLK for a time period in accordance with the signals input therein; and a frequency divider $17_i$ (i=0 to M) for $\frac{1}{2}^N$-frequency-dividing the signal GATED 1T CLK $32_i$ and outputting a signal #i CLK to the magnetic disk unit #i.

The output signal MASTER 1T CLK from the frequency generator 11 is supplied to the frequency divider 12 and the clock window circuits $16_0$, $16_1$, ..., $16_M$. The frequency divider 12 frequency-divides the signal MASTER 1T CLK (the frequency of which is generally 10,000 times or more a rotation frequency of the spindle motor 3) and outputs the signals $2^1T$, $2^2T$, ..., $2^NT$ CLK. The signals $2^1T$, $2^2T$, ..., $2^KT$ CLK (K<N) are commonly supplied to data terminals of the data selectors $13_0$, $13_1$, ..., $13_M$.

The frequency divider 14 frequency-divides the signal $2^NT$ CLK, one of the output signals from the frequency divider 12, and outputs the master index signal MI which has a pulse generated for each rotation of the spindle motor 3. The master index signal MI is supplied to the time interval detectors $15_0$, $15_1$, ..., $15_M$.

The time interval detector $15_i$ (i=0 to M) detects a time interval ΔT between the master index signal MI and the drive index signal #iDI from the disk unit #i and checks whether the time interval ΔT falls within the range of desired time interval 0 to $t_0$. If the time interval ΔT falls outside the desired range, the time interval detector $15_i$ outputs the phase control signal $18_i$ and the predetermined select signal $19_i$ corresponding to the time interval ΔT.

FIG. 3 is a circuit diagram showing an embodiment of the time interval detector $15_0$ shown in FIG. 2. FIGS. 4(a) to 4(h) are timing charts for explaining an operation of the circuit shown in FIG. 3. Referring to FIGS. 3 to 4h, in the time interval detector $15_0$, the master index signal MI is supplied to the data terminal of a flip-flop (to be referred to as an FF hereinafter) 20 and the drive index signal #0DI from the disk unit #0 is supplied to the clock terminal of the FF 20 and one input terminal of an AND gate 21. A $\overline{Q}$ output signal from the FF 20 is supplied to the other input terminal of the AND gate 21. In this manner, if the drive index signal #0DI does not rise while the master index signal MI is active ("1"), the AND gate 21 outputs the drive index signal #0DI as the phase control signal $18_0$. The phase control signal $18_0$ is supplied to the clock window circuit $16_0$ and the clock terminal of an FF 22 in the time interval detector $15_0$. A Q output from the FF 22 is supplied to the data terminal and the clear terminal of an FF 23. The master index signal MI is supplied to the clock terminal of the FF 23. A $\overline{Q}$ output from the FF 23 is supplied to the clear terminal of the FF 22. In this manner, a signal which is kept active from the rise of the phase control signal $18_0$ (drive index signal #0DI) to the rise of the master index signal MI, i.e., a ΔT detection signal 24 is obtained at the Q output of the FF 22. A microprocessor 25 receives the ΔT detection signal 24 and outputs a select signal $19_0$ corresponding to the duration of the input signal. For example, assume that a time period $T_0$ of one rotation of a disk is equally divided into eight time intervals. In this case, the microprocessor 25 outputs a select signal $19_0-1$ if $0<\Delta T \leq T_0/8$, a select signal $19_0-2$ if $T_0/8<\Delta T \leq T_0/4$, a select signal $19_0-3$ if $T_0/4<\Delta T \leq T_0/2$, and a select signal $19_0-4$ if $T_0/2<\Delta T<T_0$, and supplies the select signal to a select terminal SEL of the data selector $13_0$ shown in FIG. 2. The arrangements and operations of the time interval detectors $15_1$ to $15_M$ are the same as those of the time interval detector $15_0$.

Referring to FIG. 2, the data selector $13_0$ outputs one of the clocks 2T CLK to 2KT CLK in accordance with the select signal $19_0$. For example, the data selector $13_0$ selects the signals 2T CLK, 4T CLK and 8T CLK in accordance with the select signals $19_0-1$, $19_0-2$ and $19_0-3$, respectively. That is, if the time interval represented by the ΔT detection signal 24 is long, a low-frequency clock which is frequency-divided by a large number is selected, and if it is short, a high-frequency clock which is frequency-divided by a small number is selected. The output signal from the data selector $13_0$ is supplied to the clock window circuit $16_0$. The clock window circuit $16_0$ operates in accordance with the phase control signal $18_0$ and the master index signal MI in addition to the output signal from the data selector $13_0$ and masks the signal MASTER 1T CLK for a time period corresponding to the pulse width of the output signal $34_0$ from the data selector $13_0$. The other data selectors $13_1$ to $13_M$ similarly operate.

Figure 5:
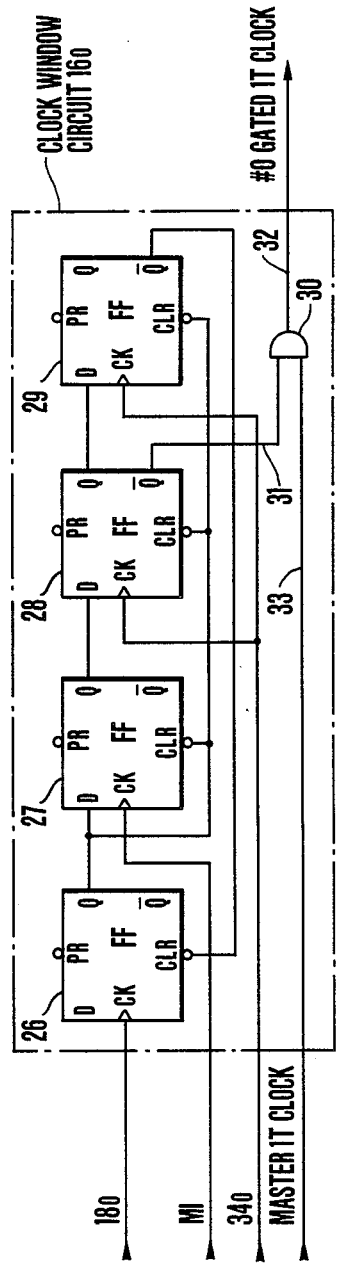
FIG. 5 is a circuit diagram showing an embodiment of a clock window circuit shown in FIG. 2.
Figure 6:
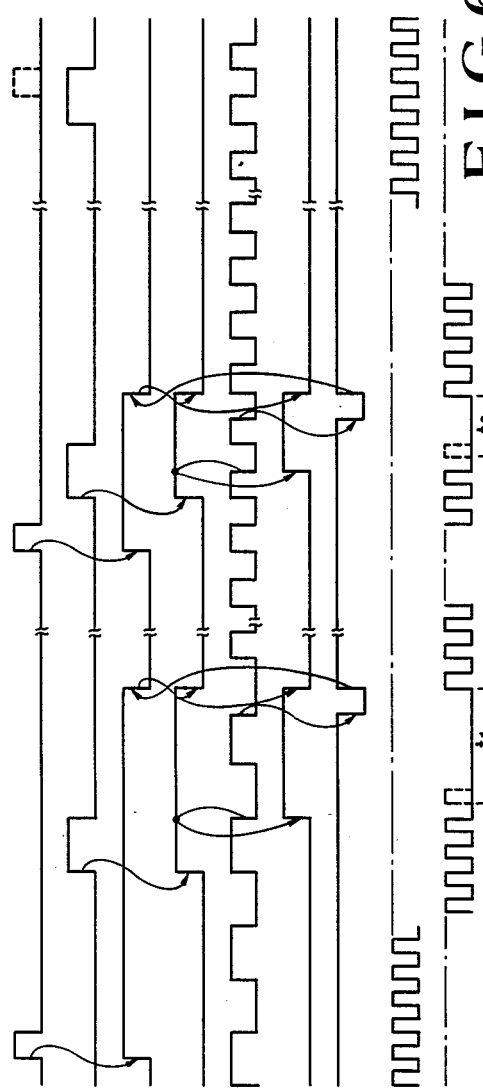
FIGS. 6(a) to 6(i) are timing charts for explaining an operation of the circuit shown in FIG. 5.

FIG. 5 is a circuit diagram showing an embodiment of the clock window circuit $16_0$ shown in FIG. 2. FIGS. 6(a) to 6(i) are timing charts for explaining an operation of the circuit shown in FIG. 5. Referring to FIG. 5, the phase control signal $18_0$, the master index signal MI, and the output signal $34_0$ from the data selector $13_0$ are supplied as clocks to the clock terminal of an FF 26, the clock terminal of an FF 27, and the clock terminals of FFs 28 and 29, respectively, of the clock window circuit $16_0$. A Q output from the FF 26 is supplied to the data terminal of the FF 27 and the clear terminals of the FFs 27, 28 and 29. A $\overline{Q}$ output from the FF 29 is supplied to the clear terminal of the FF 26. By ANDing a Q output from the FF 28 and the MASTER 1T CLK from the frequency generator 11, a pulse train from which pulses corresponding to one period of the output signal $34_0$ from the data selector $13_0$ are masked, i.e., a signal GATED 1T CLK $32_0$ is obtained. The signal GATED 1T CLK $32_0$ is frequency-divided by the frequency divider 17 and supplied as a reference clock pulse #0 CLK of a PLL circuit 6 of the magnetic disk unit #0. The phase of the reference clock pulse #0 CLK is delayed at masked portions by time intervals ($t_1$ and $t_2$ in FIG. 6(i)) corresponding to the numbers of masked pulses of the MASTER 1T CLK. As the number of masked pulses is increased, the phase delay is increased. Upon a known operation of the PLL circuit 6, a portion to be controlled, i.e., a rotation phase of the spindle motor 3 of the disk unit #0 is delayed. That is, the rotation phase of the spindle motor 3 can be controlled by controlling the phase of the reference clock pulse #0CLK of the PLL circuit 6 by the above means.

The arrangements and operations of the clock window circuits $16_1$ to $16_M$ are identical to those of the clock window circuit $16_0$.

As has been described above, according to the present invention, the time interval between the master index signal and the drive index signal is detected, and is changed in accordance with the detected time interval, thereby changing the degree of phase delay of the reference clock pulse of the PLL circuit for controlling rotation of the spindle motor. As a result, without reducing precision of phase matching between drive indexes of a plurality of disk units, synchronous drive can be effectively performed while a time period required for a phase matching is reduced.

What is claimed is:

1. A spindle motor control system for a magnetic disk apparatus comprising a magnetic disk unit which outputs an index signal upon rotation of a spindle motor therein and inputs a control signal for controlling a rotation of the spindle motor by the control signal, and control means for inputting the index signal from said magnetic disk unit to output the control signal to said magnetic disk unit, said control means comprising
   means for generating a master clock signal of a predetermined frequency;
   means for frequency-dividing the master clock signal to generate a plurality of frequency-divided signals;
   means for generating a master index signal upon each rotation of said spindle motor by frequency dividing one of the plurality of frequency-divided signals;
   detector means for detecting a time interval between the master index signal and the index signal to output a phase control signal and a select signal;
   selector means for selecting and outputting one of the plurality of frequency-divided signals from said frequency-dividing means in accordance with the select signal;
   means for masking the master clock signal for a time period in accordance with the phase control signal, the master index signal, and an output signal of said selector means to output the control signal to said magnetic disk unit.

2. A spindle motor control system for a magnetic disk apparatus comprising:
   at least one magnetic disk unit which includes a spindle motor for driving a magnetic disk and outputs an index signal upon rotation of said spindle motor and controlling rotation of said spindle motor by a clock signal; and
   control means for controlling said at least one magnetic disk unit, said control means comprising:
   a frequency generator for generating a master clock signal of a predetermined frequency;
   a first frequency divider for frequency-dividing the master clock signal from said frequency generator by $2^1, 2^2, \ldots, 2^N$;
   a second frequency divider for frequency-dividing the signal frequency-divided by $2^n$ to generate a master index signal upon each rotation of said spindle motor;
   a time interval detector for detecting a time interval between the master index signal and the index signal output from said at least one magnetic disk unit and outputting a phase control signal and a select signal corresponding to the detected time interval;
   a data selector for selecting and outputting one of the signals frequency-divided by $2^1, 2^2, \ldots, 2^N$ in accordance with the select signal;
   a clock window circuit for masking the master clock signal from said frequency generator for a time period in accordance with the phase control signal, the master index signal, and an output signal of said data selector; and
   a third frequency divider for frequency-dividing the output signal from said clock window circuit and supplying the frequency-divided signal as the clock signal to said at least one magnetic disk unit.

3. A spindle motor control system according to claim 2, wherein said clock window circuit comprises: a first flip-flop circuit (FF) for inputting the phase control signal as a clock signal; a second FF for inputting a Q output of said first FF as data and the master index signal as a clock signal; a third FF for inputting a Q output of said second FF; and a fourth FF for inputting a Q output of said third FF as data; and an AND gate for inputting $\overline{Q}$ output of said third FF and the master clock signal to output a gated clock signal to said third frequency divider; said third and fourth FFs inputting the output signal of said data selector as clock signals thereof, said second, third and fourth FFs being commonly cleared by the Q output of said first FF, and said first FF being cleared by a $\overline{Q}$ output of said fourth FF.

4. A spindle motor control system according to claim 1, wherein said time interval detector comprises: a first flip-flop circuit (FF) for inputting the master index signal and the index signal as data input and a clock, respectively; an AND circuit for ANDing a $\overline{Q}$ output of said first FF and the index signal to output the phase control signal to said clock window circuit; a second FF for inputting the phase control signal as a clock signal; a microprocessor for inputting a Q output of said second FF as a time interval signal and the phase control signal to output the select signal to said data selector; and a third FF for inputting a Q output of said second FF as an input data and the master index signal as a clock signal; the second FF being cleared by a $\overline{Q}$ output of said third FF.

* * * * *